Oct. 10, 1972   J. W. WEIGL   3,697,409
BELT ELECTRODE IMAGING SYSTEM
Filed Dec. 12, 1969   3 Sheets-Sheet 1

INVENTOR.
JOHN W. WEIGL
BY
ATTORNEY

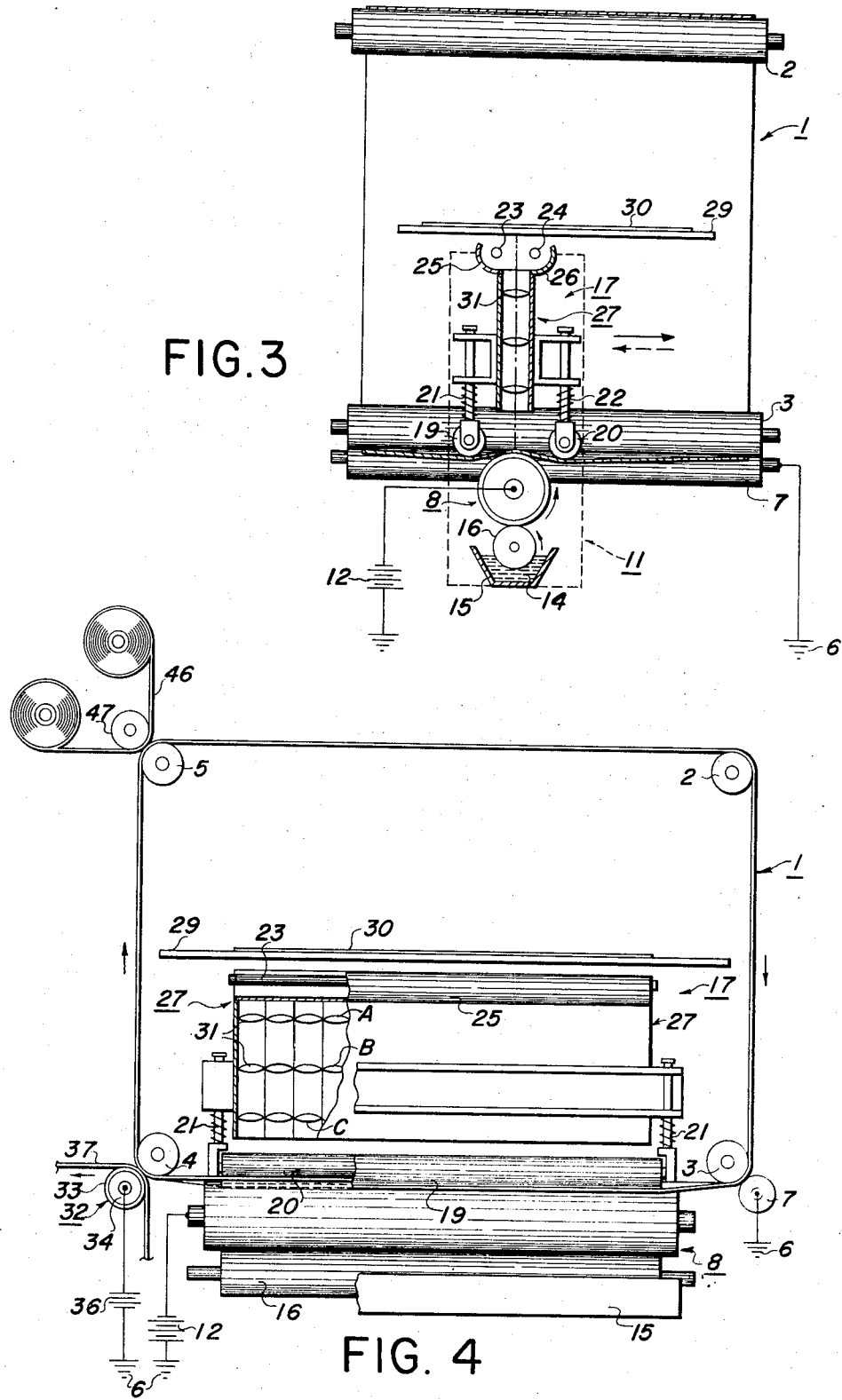

United States Patent Office 3,697,409
Patented Oct. 10, 1972

3,697,409
BELT ELECTRODE IMAGING SYSTEM
John W. Weigl, West Webster, N.Y., assignor to Xerox Corporation, Rochester, N.Y.
Filed Dec. 12, 1969, Ser. No. 884,428
Int. Cl. C23b 13/00; B01k 5/02
U.S. Cl. 204—300                                                9 Claims

ABSTRACT OF THE DISCLOSURE

A flexible transparent belt electrode is formed into a loop with a roller electrode positioned against the loop on its outside surface. Platens are positioned inside the loop and light is projected through the belt to photoelectrophoretic ink between the belt and roller electrodes.

BACKGROUND OF THE INVENTION

This invention relates to imaging systems and particularly to novel photoelectrophoretic imaging methods and apparatus.

In the photoelectrophoretic imaging process, an image is formed from an imaging suspension or ink by subjecting the ink to an electric field and exposing it to activating electromagnetic radiation, e.g. visible light. The imaging suspension is comprised of light sensitive particles suspended within an insulating liquid carrier and believed to bear a net electrical charge while in suspension. Normally, the ink is placed between injecting and blocking electrodes used to establish the electric field and is exposed to a light image through one of the electrodes which is at least partially transparent. According to one theory, particles attracted to the injecting electrode by the electric field exchange charge with the injecting electrode when exposed to light and migrate under the influence of the field through the liquid carrier to the blocking electrode. As a result of the migration, positive and negative images are formed on the two electrodes. The blocking electrode is covered with a dielectric material to prevent charge exchange with the particles and thereby prevent the particles from oscillating back and forth between the two electrodes.

The photoelectrophoretic imaging process is either monochromatic or polychromatic depending upon whether the light sensitive particles within the liquid carrier are responsive to the same or different portions of the light spectrum. A full color polychromatic system is obtained, for example, by using cyan, magenta and yellow colored particles which are responsive to red, green and blue light respectively. An extensive and detailed description of the photoelectrophoretic process is found in U.S. Pats. 3,384,565 and 3,384,484 to Tulagin and Carreira, 3,383,993 to Yeh and 3,384,565 to Clark and the disclosures of these patents are expressly incorporated by reference into the present disclosure.

In the above noted patents one of the electrodes used to establish a field across the photoelectrophoretic ink is a rigid structure formed from transparent glass. Usually the glass is overcoated with a transparent conductive material enabling the rigid member to functionally comprise an injecting electrode. In the above noted patents the rigid electrode is included in a flat plate structure whereas in patents such as 3,427,242 to Mihajlov it is included in a drum structure. Both the drum and flat plate electrode configurations have proved successful in the production of high quality images. Nonetheless, there is a continuing need for new methods, materials, structures and combination of components in order to provide even more rapid and/or efficient machines for the serial production of images.

Accordingly, it is an object of the present invention to improve the photoelectrophoretic imaging process. Specifically, it is an object of this invention to devise novel methods and apparatus for the serial production of photoelectrophoretic images.

Another object of the invention is to use a flexible transparent belt member as one of the electrodes in a photoelectrophoretic imaging system.

Still another object of this invention is to simplify the exposure mechanism employed in a photoelectrophoretic imaging machine.

Another object of the invention in keeping with the foregoing object is to position an original to be reproduced inside a transparent continuous electrode surface so as to be able to use simple exposure apparatus to project an image of the original to photoelectrophoretic ink on the outside of the continuous electrode surface.

The foregoing and other objects of the present invention are accomplished by forming a continuous loop from a transparent belt member that comprises one of the system electrodes. A roller or imaging electrode is placed on the outside of the looped belt and in all but one embodiment is propelled along a segment of the belt to form an image. The belt is then circulated, i.e. rotated, to move the image on the belt past transfer and cleaning stations and to bring a new belt segment into position for the formation of the next image. The optical or exposure means are positioned inside the loop and comprise lamps and a lens strip supported for movement with the roller electrode either parallel or transverse to the belt. The exposure means projects a light image, i.e. appropriate activating electromagnetic radiation, to photoelectrophoretic ink in the nip formed between the roller and belt electrodes. In yet another embodiment, the roller electrode and exposure means are stationary and the roller electrode is rotated synchronously with the belt and a drum platen positioned inside the looped belt electrode.

DESCRIPTION OF THE DRAWINGS

Other objects and features of the present invention will be apparent from a reading of the present specification and from the drawings which are:

FIG. 3 is a cross-section elevation view of the apparatus in FIG. 1 with the roller electrode and scanning apparatus rotated 90°;

FIG. 4 is a side elevation view of the apparatus of FIG. 3; and

DESCRIPTION OF THE INVENTION

Figure 1:
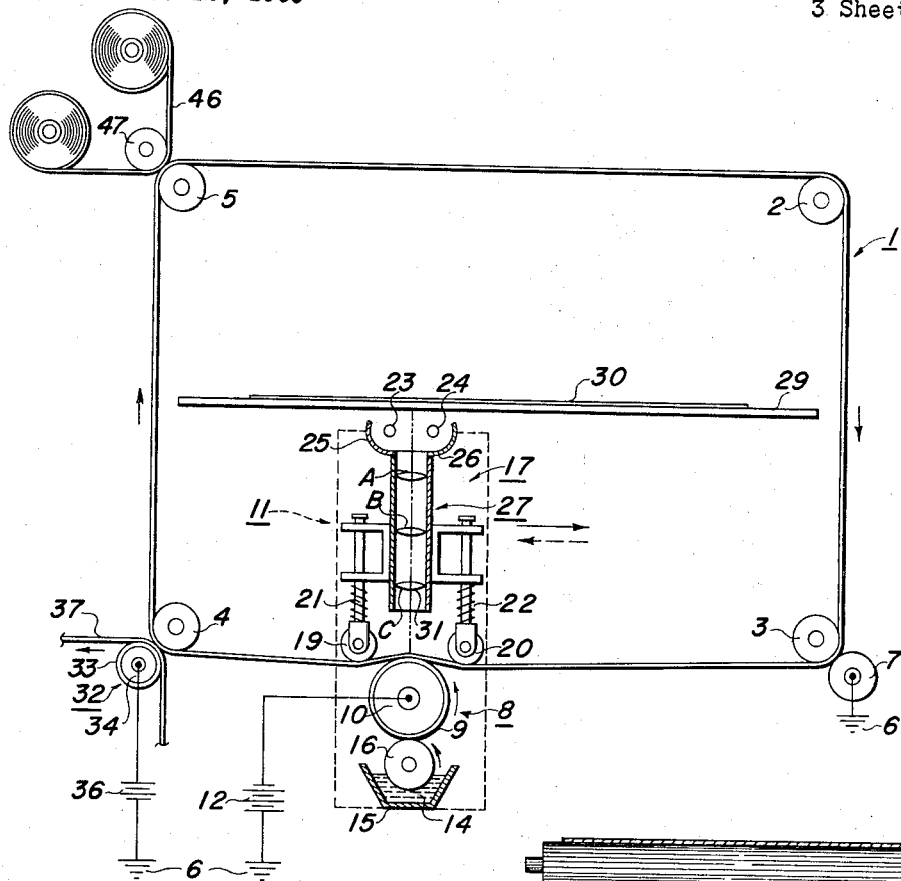
FIG. 1 is a schematic side elevation view of a photoelectrophoretic imaging system according to the present invention.

FIG. 1 illustrates photoelectrophoretic imaging apparatus according to the present invention that includes the flexible belt member or electrode 1. The belt is formed into a continuous loop supported by the four support rollers 2–5. The belt member moves when roller 2 is rotated by a motor drive means appropriately coupled to it. The belt is said to rotate or circulate around the four supporting rollers 2–5 as a result of rotating the power input support roller 2. The belt member is transparent to electromagnetic radiation to which photoelectrophoretic ink used by the system is sensitive. The belt includes a transparent substrate of any suitable flexible polymer of sufficient mechanical strength such as polyvinylchloride or polyethylene and has a transparent layer of aluminum or other conductive material coated on its outside surface, i.e. the surface facing the imaging roller 8. The belt, as described, is functionally the injecting electrode for the system but it should be understood that the transparent conductive layer of the belt can be on the inside surface thereby permitting the flexible belt to be the blocking electrode because the transparent substrate is normally electrically insulating. When the conductive layer is on the outside of the belt, a voltage potential source e.g., the ground potential 6, is coupled to the belt by means of the conductive roller 7 which is continuously in contact with the conductive layer on the belt. When the condutive layer is on the inside surface of the belt electrode, or alternately the belt substrate is electrically conductive, a voltage potential source is coupled to the belt through one of the support rollers, e.g. roller 3, which are continuously in contact with the belt.

The imaging system of FIG. 1 also includes the roller or imaging electrode 8 which is the blocking electrode for the present system being composed of an outer layer 9 of electrically insulating material and an inner core 10 of electrically conducting material. Again, it should be understood that imaging electrode 8 can be made solely from conductive materials and thereby serve as the injecting electrode for the system. In any event, high voltage potential source 12 (generally in the order of ±3-4000 volts) is coupled to the imaging electrode to establish a field between it and the electrically grounded belt electrode 1. The imaging electrode is journaled for rotation and coupled to appropriate drive means for rotating it and for propelling it along the planar segment 13 of the belt electrode between the support rollers 3 and 4. The imaging roller 8, ink tank 15 and exposure mechanism 17 are supported by appropriate means 11 to enable them to move together relative to the belt.

Photoelectrophoretic ink 14 is stored in tank 15 and is the material from which the desired images are formed. The inking roller 16 is journaled in the walls of the tank and is rotated by appropriate drive means. The ink adheres to the surface of the inking roller and coats the surface of the rotating imaging electrode 8. The ink is carried into the nip 7 between the electrodes 1 and 8 by the rotating imaging electrode. The nip is the area on the belt and imaging electrodes 1 and 8 defining an interface between the two electrodes whether they are in contact or separated by the ink. The ink in the nip is subjected to an electric field by virtue of the ground potential 6 coupled to the belt electrode and the high voltage source 12 coupled to the imaging electrode. The ink in the nip is exposed to activating electromagnetic radiation by the slit scan exposure mechanism 17. Preferably, ink 14 is a polychromatic ink and the resultant colored image is formed on the outside surface of the belt electrode. The image is formed by a subtractive process wherein the ink particles struck by activating electromagnetic radiation migrate under the influence of the electric field from the belt electrode toward the roller electrode 8 with the ink particles remaining at the belt electrode 1 forming the desired image. The image on the belt is a positive of the input target or original because the ink particles struck by light migrate away thereby creating light tone areas for light tone areas and dark tone areas for dark tone areas.

The dimensions of the nip are established, at least in part, by the tension in the belt planar segment 13, the upward directed force exerted by the imaging electrode 8 on the belt electrode and the downward directed force exerted by the compression rollers 19 and 20 on the belt. The compression rollers serve principally the mechanical function of urging the belt electrode into contact with the imaging electrode. Each compression roller is journaled for rotation by appropriate bearings and is supported for movement with the exposure mechanism 17 and support means 11. The compression rollers are free to rotate by reason of friction contact with the inside of the belt electrode. The coiled extension springs 21 and 22 are coupled to the rollers 19 and 20 respectively and bias the rollers downward but allow for movement in an upward direction under dynamic conditions. The compression rollers are positioned on either side of the nip to allow the exposure mechanism 17 to illuminate the ink.

The slit scan exposure mechanism 17 is positioned inside the loop formed by the belt electrode and is supported by means 11 for travel with the imaging electrode 8. The mechanism 17 includes the lamps 23 and 24, the reflectors 25 and 26 and the lens strip 27. The lamps are elongated mercury arc discharge lamps (or some other appropriate illuminant) that extend generally the width of platen 29. The platen is transparent to the electromagnetic radiation generated by the lamps allowing a light image to be reflected off the original document 30 resting on the platen. The parabolic reflectors 25 and 26 flood substantially a linear element of the original 30 which is projected to ink in the nip. The exposure mechanism and imaging roller move together relative to the platen and belt to obtain a full frame projection of a light image of the original 30 on the belt electrode.

The lens strip 27 is made from a plurality of miniature lenses 31 stacked in groups or columns of three and aligned in rows A, B, and C that extend substantially across the width of the platen 29 (FIGS. 1 and 4). Each lens column projects an incremental element of the light flooded region on the platen to the nip. The incremental light image projected to the nip appears as a reverse reading image when viewed looking at the outside surface of the transparent belt toward the platen. Each individual lens in the column converts a right reading image to a reverse reading image with three lenses yielding a net single reversal. Naturally, the photoelectrophoretic image formed on the belt is reverse reading but is once again right reading when transferred to a sheet or web transfer member. The dimensions of a lens strip 27 are in the neighborhood of ¼ x ½ x 10 inches thereby providing a very compact exposure mechanism. The lens strip is particularly advantageous for the present embodiment in that the looped belt electrode can be made very compact. The dimensions of the lens strip are exaggerated in the drawings to more clearly illustrate its features. A detailed description of a lens strip of the present type is given in a copending application of Gundlach et al. Ser. No. 683,987, now U.S. Pat. 3,584,952, issued June 15, 1971.

As indicated, a full frame photoelectricphoretic image of an original 30 is formed on the outside surface of the belt by: rotating the imaging electrode 8 to bring ink 14 into the nip; coupling the voltage sources 6 and 12 to the electrodes to create an electric field across the ink; energizing lamps 23 and 24 (by an appropriate energy source coupled thereto) to flood a linear element of an original on platen 29 with light and thereby expose the ink in the nip; and moving the exposure mechanism 17 and the imaging electrode 8 relative to the platen 29 and belt segment 13 thereby generating in a line by line fashion a full frame reproduction of the original. After the photoelectrophoretic image is formed on the belt, the belt is rotated clockwise by power input roller 2 taking the newly formed image past the transfer roller 32. The transfer roller is structurally substantially the same as the imaging electrode being composed of an outer layer 33 of electrically insulating material and an inner core of conductive material 34. The inner core is coupled to a voltage potential source 36 having a polarity opposite to the voltage source 12 coupled to the imaging electrode. The electric field in the nip formed between the belt and transfer roller effects transfer of the ink from the belt to the web or sheet 37 fed in the same direction as the belt by appropriate drive means.

The transfer roller is means for establishing contact between a transfer member, e.g. web 37, and an image on the belt electrode and for establishing an electric field across the ink for its removal. If the web 37 is insulating the transfer roller need not have an outer layer of insulating material. Actually, since the ink carrier liquid is electrically insulating, it can be the only dielectric between two voltage potentials. In addition, the web 37 can include an electrical insulating layer facing the belt and a conductive backing layer coupled to the voltage source 36. In this case the transfer roller acts to bring the transfer member into contact with the image but need not be used to establish the transferring electric field.

In the embodiment of FIG. 1, the exposure mechanism 17 and imaging roller move together from the left end to the right end of the platen 29. Thereafter, the belt segment 13 moves left toward the transfer roller 32. The exposure mechanism and imaging electrode can remain at the right end of the platen or move, staying behind the imaged belt area, back to a starting position at the left end of the platen. The next image to be formed can be formed by now moving the belt from right to left. However once this image is formed, the roller electrode is in the way if the belt now moves toward the transfer roller 32 and can smear or otherwise harm the image. This result is avoided by rotating the imaging roller at a speed that gives a substantially zero relative velocity between the belt and roller. Also, the belt may be moved right toward a second transfer roller positioned, for example, opposite the support roller 3. In this case, successive images are alternately removed from the belt by the transfer roller 32 at the left end of the platen and a second transfer roller at the right end of the belt. For this embodiment, the belt electrode can be wound between two spools.

Figure 2:
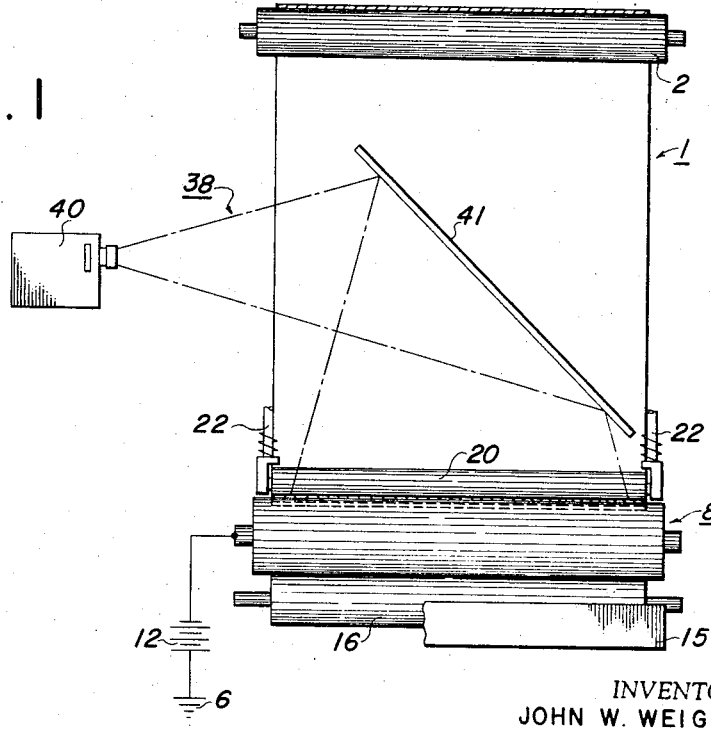
FIG. 2 is an elevation cross-section view of the apparatus of FIG. 1 with transparency projection apparatus substituted for the opaque slit scan apparatus of FIG. 1.

The embodiment shown in FIGS. 3 and 4 has the advantage over the embodiments shown in FIGS. 1 and 2 in that there is no need to recycle the imaging roller or reverse the direction in which the belt is rotated. In the embodiment of FIGS. 3 and 4, the imaging roller is turned 90° from the position shown in FIGS. 1 and 2. Since FIGS. 3 and 4 use the exposure mechanism 17 it too is turned 90° from the position shown in FIG. 1. The embodiment of FIG. 2 is modified to conform generally to that of FIGS. 3 and 4 by merely turning the imaging roller 90° and no change need be made to the full frame exposure mechanism 38. The imaging roller now forms a nip with the belt electrode that is parallel to the belt segment 13 and the image is formed as the imaging electrode roller 8 moves transversely across the belt. Once it has made an image forming pass, say left to right as seen in FIG. 3, the imaging roller stops to allow the photoelectrophoretic image to be transferred by moving the belt past the transfer roller 32. Next it moves right to left to form a subsequent image and comes to rest on the opposite side of the belt. The belt electrode is once again advanced in the same direction past the transfer station 32 without danger of smearing or otherwise interfering with the image. The imaging electrode 8, the exposure mechanism 17 if being used, is passed back and forth over the width of the belt electrode in the manner described conveniently and rapidly forming a series of images.

The compression rollers are also used in the embodiment of FIGS. 3 and 4. Preferably for all the embodiments the compression rollers are relatively closely spaced to each other and the imaging electrode and all three rollers remain in contact with the belt when they come to a rest relative to the belt. In the embodiment of FIG. 3, the imaging electrode roller 8 comes to rest at least some small distance beyond the boundaries of the image on both the left and right sides of the belt electrode. However, the compression rollers and imaging roller are preferably kept in contact with the belt electrode at all times even when at the rest positions. One reason for this is to insure proper mating of the various rollers with the belt electrode prior to each imaging pass made by them. The belt may include some special low friction material such as Teflon on proper areas to implement the sliding of the belt electrode lengthwise over the imaging electrode. Similarly, a material such as Teflon may be coated on proper areas on the back or inside of the belt electrode to implement the sliding of the belt lengthwise over the compression rollers.

A beneficial feature of the embodiments of FIGS. 1–4 over conventional flat plate imaging systems is that the moving imaging electrode is never separated from the belt electrode thereby always maintaining the nip intact. Keeping the nip intact yields greater consistency in system performance because the configuration of the nip has been demonstrated to affect ink particle migration, i.e. image formation and transfer. If the two electrodes defining a nip are never separated, the nip is more likely to maintain the same configuration than if the electrodes are repeatedly separated and rejoined. In the foregoing discussion, a roller electrode is repeatedly moved over new planar segments of a belt electrode without ever separating the electrodes. This is possible in the embodiments of FIGS. 1–4 because the belt electrode is held stationary during image formation and thereaftermoved to prepare for the formation of the next image.

The embodiment shown in FIG. 2 utilizes the full frame exposure mechanism 38 to expose the nip between imaging roller 8 and the belt electrode 1. The mechanism 38 includes a transparency projector 40 and the plane mirror 41. The projector is of conventional design having a light source positioned behind a transparency holder and a lens on the other side of the transparency holder for projecting the light. The light projected (conventionally a light image of a transparency in the holder) is reflected downward onto the planar segment 13 of the belt electrode. The light projected is sufficient to illuminate substantially the entire planar segment 13 and does so for the length of time required for the imaging roller to travel over the illuminated area. As the imaging roller travels over the illuminated area the electric field in the nip enables the ink particles struck by activating electromagnetic radiation to migrate away from the belt electrode with the ink remaining on the belt forming the desired image. Once the imaging roller has traveled the length of the planar segment 13, e.g. left to right, the belt electrode is rotated clockwise to transfer the image to the transfer member 37. The imaging roller is then moved back to its starting position at the left.

Alternately, the imaging roller electrode 8 can be turned 90° to the belt such as in FIGS. 3 and 4. In this case there is no reason to move the imaging roller back to its initial starting position prior to formation of the next image. The reason being that successive images are formed during each pass of the roller electrode across the belt regardless of the direction of travel when the roller is oriented to the belt in the manner illustrated in FIGS. 3 and 4.

Figure 5:
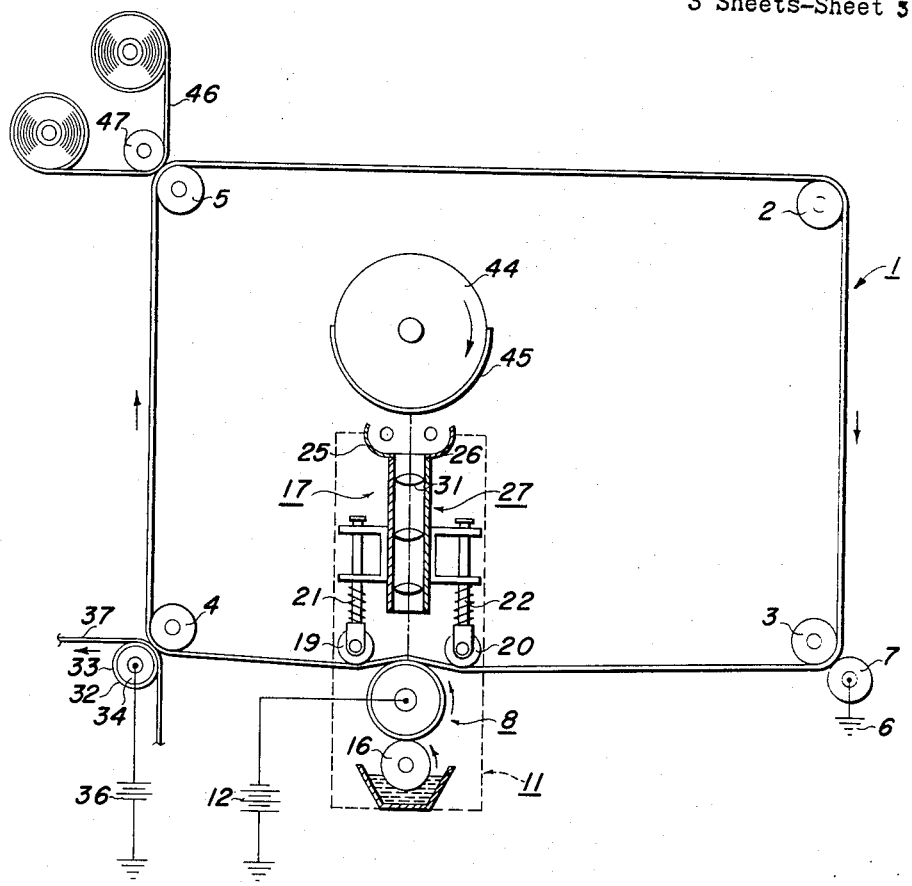
FIG. 5 is a schematic side elevation view of another embodiment utilizing a continuous loop belt electrode with a drum platen journaled for rotation and positioned inside the loop of the belt electrode.

The embodiment of FIG. 5 demonstrates another important feature of the present invention; namely, location of the platen inside a transparent continuous surface electrode such as the present looped belt or a rigid cylindrical drum. In FIGS. 1, 3, and 4 the platen is a flat plate holding an original which is scanned by a traveling optical system. The location of the platen inside the loop and its parallel orientation relative to the plane segment 13 permits relatively simple and comparatively inexpensive optical systems, e.g. mechanism 17, to be used for exposing the ink to a light image. In FIG. 5, the flat plateplaten 29 is replaced by the drum platen 44 which is adapted to carry an opaque original 45 on its periphery. In this embodiment, the internally located platen 44 and the belt are rotated clockwise, for example, while the exposure mechanism 17 and the imaging roller 8 remain stationary. Of course, the imaging roller 8 is rotated at an angular velocity that enables the velocity of a point on the periphery of the imaging roller in contact with the belt to be substantially equal to the velocity of the belt. The foregoing is a conventional technique of providing for a substantially zero relative velocity between the system electrodes to prevent smearing or otherwise adversely affecting the image. Similarly, the drum platen 44 is rotated at an angular velocity such that the velocity of the point on its periphery closest to the belt electrode is substantially equal to the velocity of the belt. This means that as the belt electrode moves past the rotating imaging electrode, a full frame reproduction of the original on platen 44 is formed on the belt in a line by line fashion.

Once again, in the embodiment of FIG. 5, the image formed on the belt is transferred to transfer member 37 as the belt travels past the transfer roller 32. In all embodiments, residue ink is cleaned from the belt electrode as it travels past the cleaning web 46. The cleaning web 46 is a fibrous material held in contact with the belt electrode by means of the cleaning roller 47 and the belt support roller 5. The cleaning web is fed between rollers 47 and 5 in the direction opposite to that of the belt. The cleaning of the belt electrode surface is principally the result of the physical contact between web 46 and belt 1. An appropriate voltage source can be coupled to the cleaning roller 47 to establish an electric field between the grounded belt electrode and the cleaning roller that is capable of removing charged ink particles from the belt electrode. Roller 47 is structurally similar to rollers 32 and 8 for this purpose.

Limitation by the specific embodiments of the invention as set forth in this application is not intended. Rather, it is intended that the claims apply broadly within the spirit and scope of this invention.

What is claimed is:

1. Photoelectrophoretic image apparatus comprising:
   (a) a transparent flexible belt loop electrode having a planar segment;
   (b) a roller electrode positioned against the outer surface of said loop electrode at said planar segment to form a nip;
   (c) exposure means located inside said loop electrode for exposing photoelectrophoretic ink located in said nip to a light image projected through said loop electrode;
   (d) means for applying an electrical field across photoelectrophoretic ink located in said nip;
   (e) first drive means for propelling said roller electrode along a segment of said loop electrode.

2. The apparatus of claim 1 and further including left and right compression members positioned on each side of said nip permitting ink located in said nip to be exposed to radiation projected through said loop electrode.

3. The apparatus of claim 1 and further including a transfer member positioned outside said loop electrode and second drive means for circulating said loop electrode to move an image formed on said loop electrode to said transfer member for removal of the image from said loop electrode.

4. The apparatus of claim 3 and further including cleaning means positioned outside of said loop electrode for cleaning the surface of said loop electrode as said loop electrode is circulated by said second drive means.

5. The apparatus of claim 3 and further including inking means for coating the surface of said roller electrode with photoelectrophoretic ink.

6. The apparatus of claim 1 wherein said exposure means includes means for projecting radiation to said planar segment in full frame imagewise configuration.

7. The apparatus of claim 1 further including a platen for holding an object to be imaged positioned inside said loop.

8. The apparatus of claim 7 wherein said exposure means includes means for projecting radiation to said platen through a linear slit to said looped belt electrode and means for moving said exposure means relative to said platen.

9. The apparatus of claim 7 wherein said platen includes a cylindrical drum journaled for rotation having means for supporting an original in a manner allowing said exposure mechanism to expose ink to radiation in imagewise configuration of the original.

References Cited
UNITED STATES PATENTS

| | | | |
|---|---|---|---|
| 2,940,847 | 6/1960 | Kaprelian | 96—1.2 |
| 3,084,043 | 4/1963 | Gundlach | 96—1.3 |
| 3,427,242 | 2/1969 | Mihajlov | 204—300 |
| 3,448,025 | 6/1969 | Krieger et al. | 204—181 |
| 3,474,019 | 10/1969 | Krieger et al. | 204—181 |

JOHN H. MACK, Primary Examiner

A. C. PRESCOTT, Assistant Examiner

U.S. Cl. X.R.

96—1 A; 204—181